US 6,654,238 B2

(12) United States Patent
Chen

(10) Patent No.: US 6,654,238 B2
(45) Date of Patent: Nov. 25, 2003

(54) FASTENING DEVICE FOR SECURING A DATA STORAGE DEVICE

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 110 days.

(21) Appl. No.: 10/002,079

(22) Filed: Nov. 1, 2001

(65) Prior Publication Data

US 2003/0081379 A1 May 1, 2003

(51) Int. Cl.[7] ................................................ G06F 1/16
(52) U.S. Cl. ...................... 361/685; 361/684; 361/726; 248/220.31; 312/223.1
(58) Field of Search ................................ 361/683–685, 361/724, 727, 730–732, 729, 735, 747; 312/223.1, 223.2, 216, 218, 251.1, 330.1, 332.1, 334.13, 333; 369/75.1, 77.1, 77.2; 248/220.31, 224.8, 60, 581, 609, 611, 500, 346.06, 229.16, 220.22, 222.12; 360/137, 137 D, 97.01, 98.01, 900; 292/31, 106, 101; 20/453, 525; 307/53

(56) References Cited

U.S. PATENT DOCUMENTS 5,463,527 A * 10/1995 Hager et al. ................. 361/685
5,801,920 A *  9/1998 Lee ............................. 361/685
6,297,952 B1 * 10/2001 Liu et al. ..................... 361/685
6,377,447 B1 *  4/2002 Boe ............................. 361/685
6,456,489 B1 *  9/2002 Davis et al. ................. 361/684

* cited by examiner

Primary Examiner—Michael Datskovsky
(74) Attorney, Agent, or Firm—Wei Te Chung

(57) ABSTRACT

A fastening device for securing a data storage device (40) includes a bracket (10) and a locating plate (12). The bracket includes first and second side panels (14, 15). The first side panel forms a pair of hooks (16), and defines a pair of through holes (22). The second side panel defines a groove (24) for slidingly receiving a screw (50) fixed to the data storage device. The locating plate includes a main body (25) with a pair of openings (30) defined therein. The openings engagingly receive the hooks, to clasp the locating plate to the first side panel. A pair of pins (26) extends from the main body for insertion into the through holes of the bracket and engagement in apertures (42) defined in the data storage device. Thus, the data storage device is firmly secured to the bracket by the fastening device.

19 Claims, 5 Drawing Sheets

FASTENING DEVICE FOR SECURING A DATA STORAGE DEVICE

BACKGROUND OF THE INVENTION

1. Field of the Invention

The present invention relates to fastening devices, and more particularly to fastening devices which readily and firmly secure computer data storage devices to brackets of computer enclosures.

2. Description of Related Art

Conventionally, a computer data storage device is directly secured to a bracket of a computer enclosure using screws. Installation and removal of the screws requires a tool. This is unduly complicated and laborious, and reduces the efficiency of assembly in mass production facilities.

A common means to overcome the above shortcomings is to have a pair of slideways formed in opposite side walls of the bracket. A sliding rail is then attached to each side of the data storage device. Thus, the data storage device can be readily slid into and secured to the bracket. Unfortunately, the sliding rails themselves are secured to the data storage device with screws. Thus use of the sliding rails does not significantly simplify the assembly procedure.

A common means for further simplifying assembly is to have a pair of plastic plates attached to opposite sides of the data storage device. The plates can secure the data storage device to a bracket without any tool. However, gaps are formed between the data storage device and the bracket. This results in increased risk of electromagnetic interference (EMI).

Examples of the abovementioned mechanisms are disclosed in Taiwan Patent Applications Nos. 78201813, 79209891, 82207667, and 82202204; and U.S. Pat. Nos. 5,510,955 and 5,262,923.

SUMMARY OF THE INVENTION

Accordingly, an object of the present invention is to provide a fastening device which readily and firmly secures a data storage device to a bracket of a computer enclosure.

A further object of the present invention is to provide a fastening device having simple structure.

In order to achieve the objects set out above, a fastening device of the present invention for securing a data storage device to a bracket of a computer enclosure comprises a bracket and a locating plate. The bracket comprises first and second side panels that are parallel to each other. The first side panel of the bracket forms a pair of hooks stamped outwardly therefrom, and defines a pair of through holes therein. The second side panel of the bracket defines a groove for slidingly receiving a screw fixed to the data storage device. The locating plate comprises a main body with a pair of openings defined therein. The openings engagingly receive the hooks of the bracket, to clasp the locating plate to the first side panel of the bracket. A pair of pins extends perpendicularly from the main body for insertion through the through holes of the bracket and engagement in apertures defined in the data storage device. Thus, the data storage device is firmly secured to the bracket by the fastening device.

Other objects, advantages and novel features of the present invention will become more apparent from the following detailed description when taken in conjunction with the accompanying drawings.

DETAILED DESCRIPTION OF THE INVENTION

Figure 1:
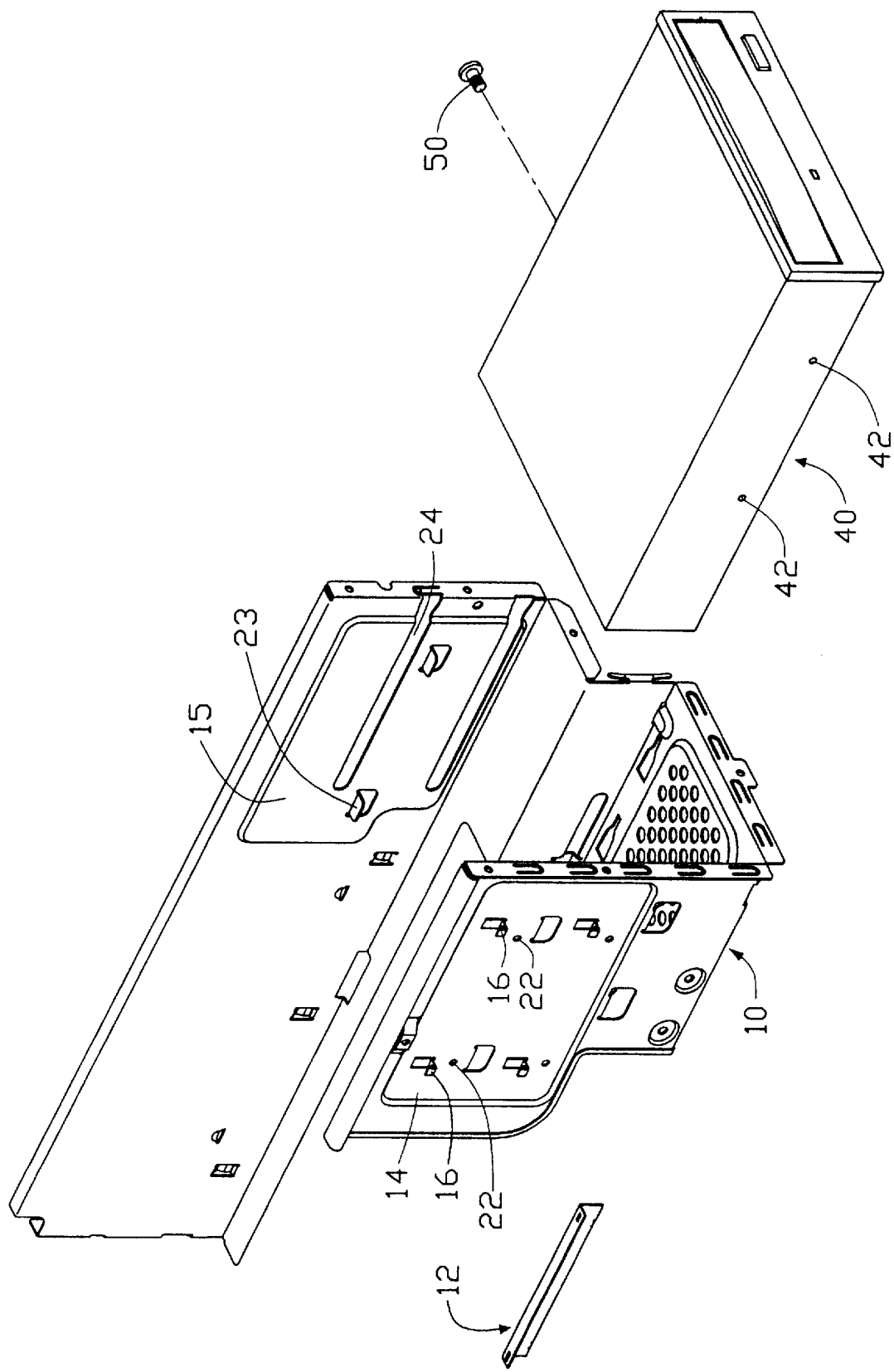
FIG. 1 is an exploded view of a fastening device in accordance with the present invention, together with a data storage device and a screw.

Reference will now be made to the drawing figures to describe the preferred embodiment of the present invention in detail.

Referring to FIG. 1, a fastening device in accordance with the present invention comprises a bracket 10 and a locating plate 12. The fastening device secures a data storage device 40 to the bracket 10, the bracket 10 being received in a computer enclosure (not shown). The data storage device 40 defines a pair of apertures 42 in a side wall thereof, and a screw hole (not visible) in an opposite side wall thereof. A screw 50 is fixed in the screw hole of the data storage device 40, such that the screw 50 still protrudes from the data storage device 40.

Figure 5:
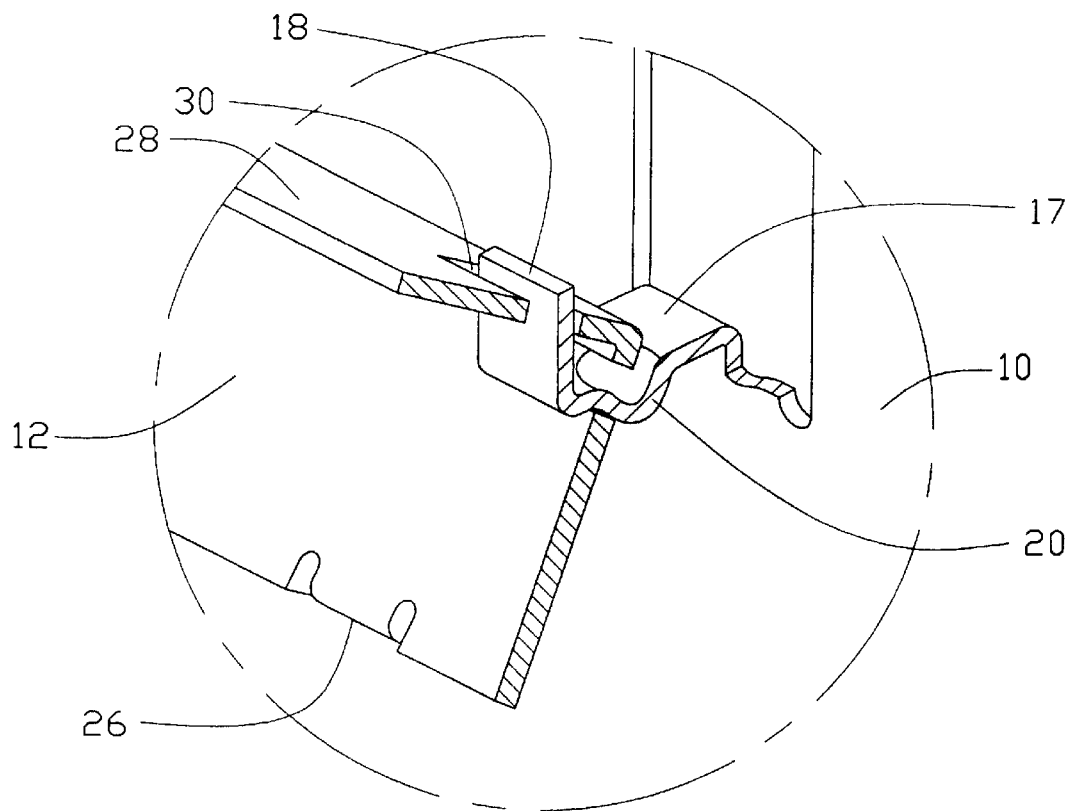
FIG. 5 is an enlarged view of a circled portion V of FIG. 3, with part of a securing mechanism shown therein cut away for clarity.
Figure 6:
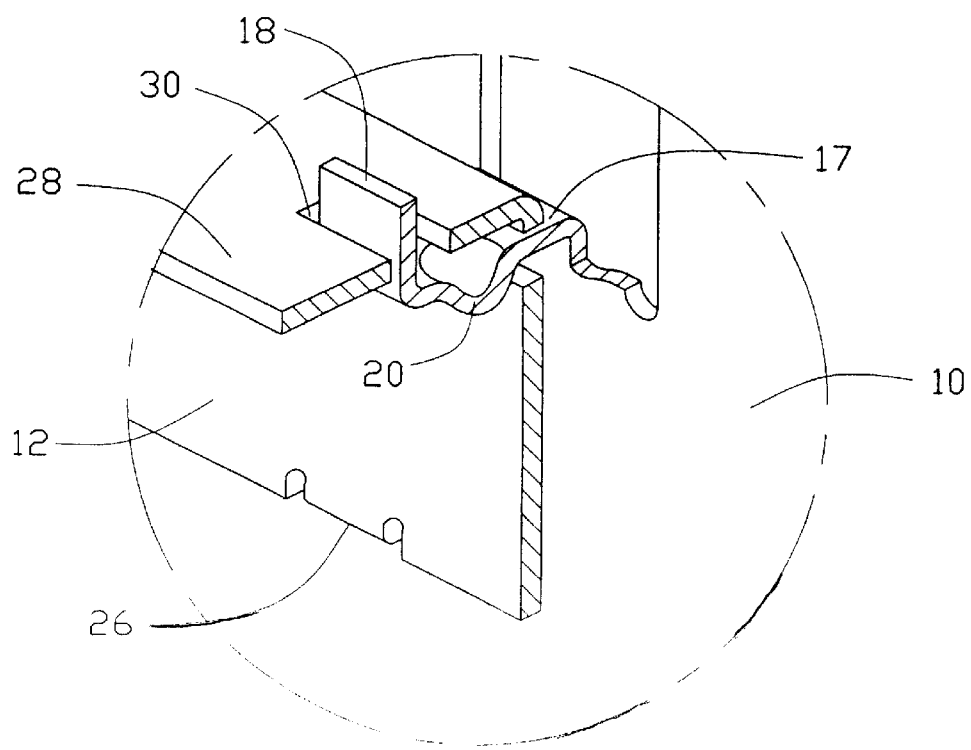
FIG. 6 is an enlarged view of a circled portion VI of FIG. 4, with part of a securing mechanism shown therein cut away for clarity.

The bracket 10 comprises a pair of opposite first and second side panels 14, 15 that are parallel to each other. A pair of hooks 16 is outwardly stamped from the first side panel 14. Referring particularly to FIGS. 5 and 6, each hook 16 comprises a horizontal portion 17, and a vertical portion 18 extending upwardly from a distal end of the horizontal portion 17. Each hook 16 thus has a generally L-shaped profile. A protrusion 20 is downwardly stamped from the horizontal portion 17. A through hole 22 is defined in the bracket 10 below each hook 16. A horizontal groove 24 is defined in a middle of a front portion of the second side panel 15 of the bracket 10, for slidingly receiving the screw 50 fixed to the data storage device 40. A plurality of support tabs 23 is inwardly and horizontally stamped from the first and second side panels 14, 15, for supporting the data storage device 50 thereon.

Figure 2:
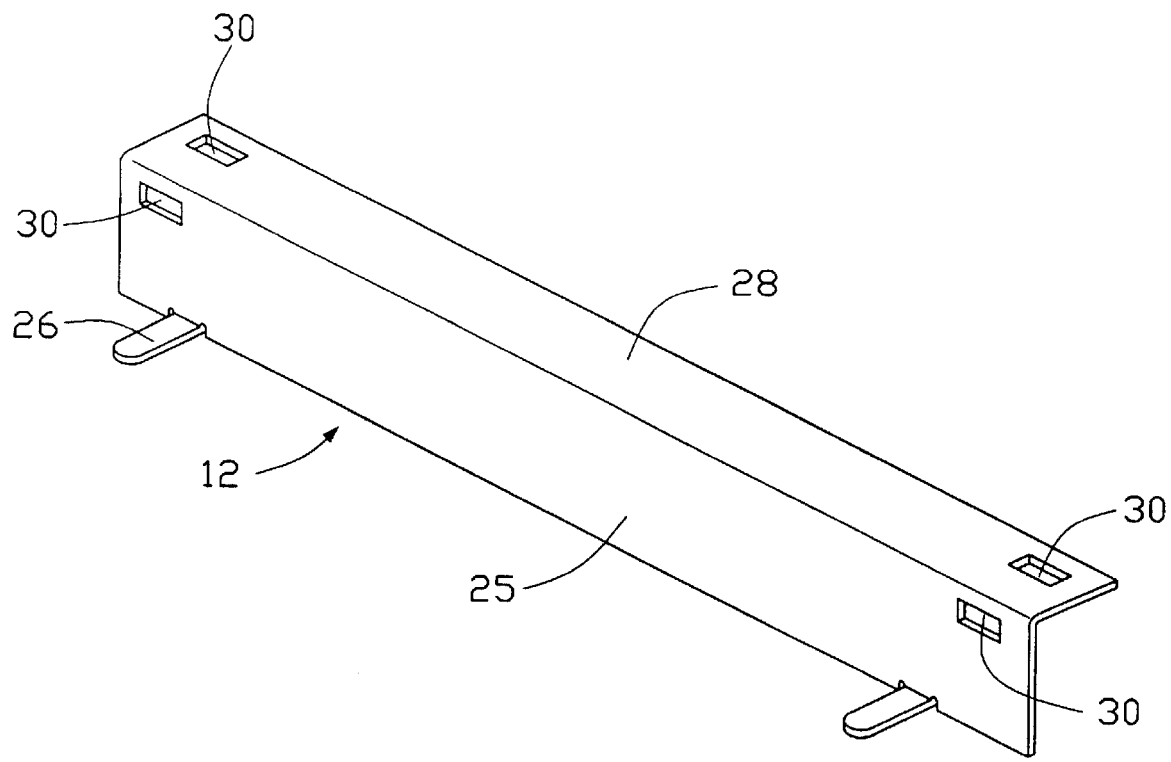
FIG. 2 is a perspective view of a locating plate of the fastening device of FIG. 1.
Figure 3:
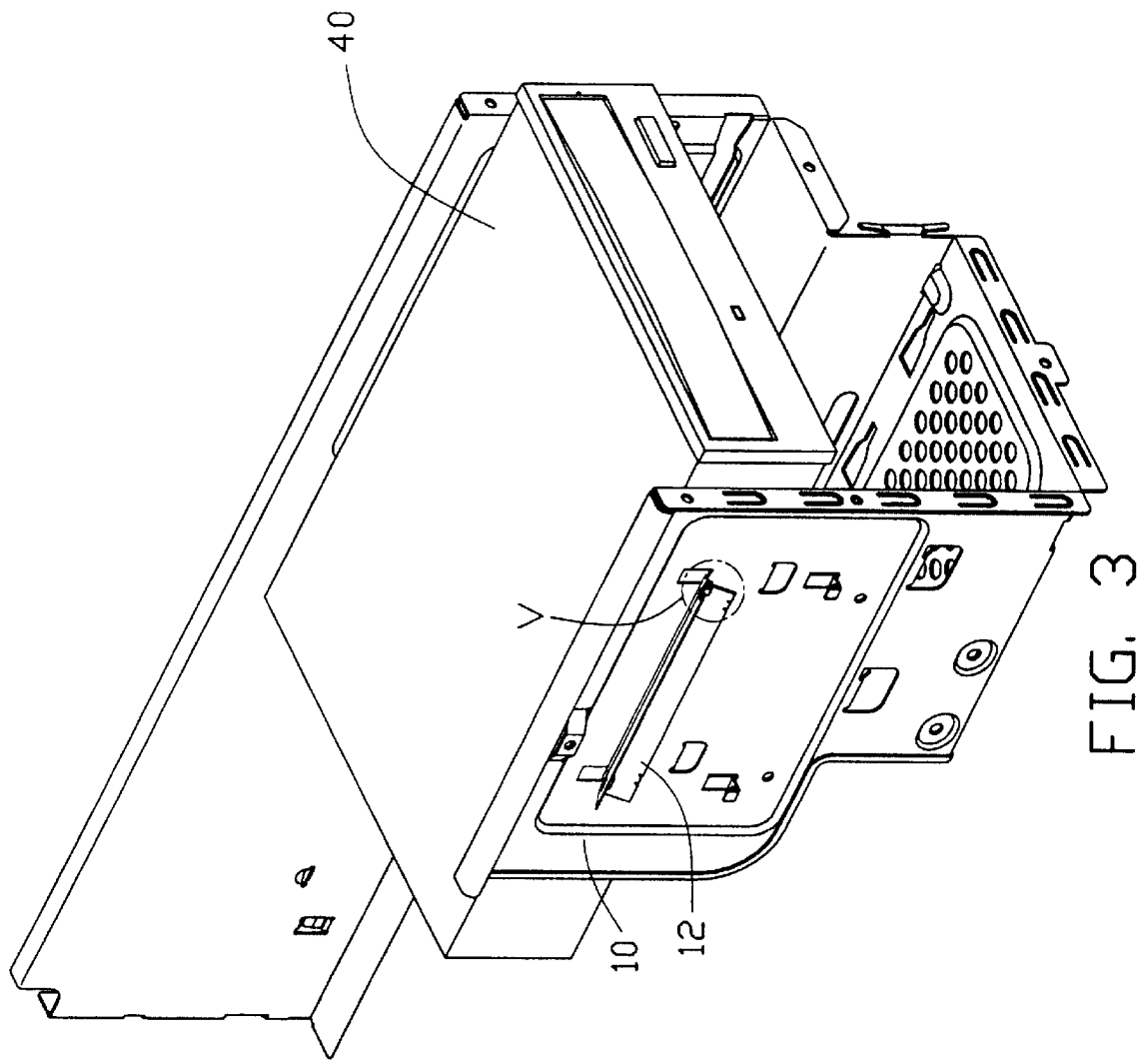
FIG. 3 is similar to FIG. 1, but showing the data storage device received in a bracket of the fastening device.
Figure 4:
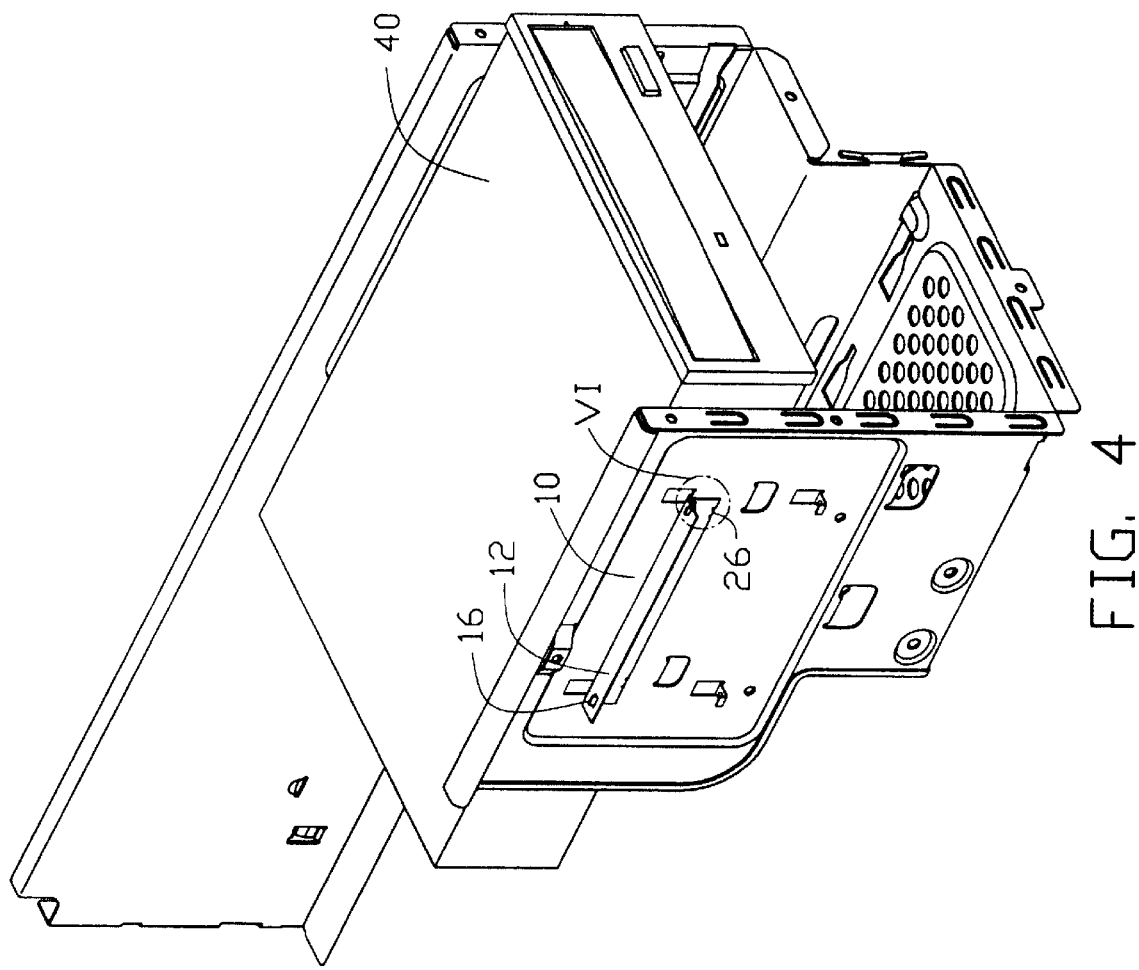
FIG. 4 is similar to FIG. 3, but showing the data storage device completely secured to the bracket by the fastening device.

Referring particularly to FIG. 2, the locating plate 12 of the fastening device is stamped from an elongated metal plate. The locating plate 12 comprises a main body 25. A pair of spaced pins 26 extends perpendicularly from a longitudinal edge of the main body 25 in a first direction. An operation portion 28 extends from an opposite longitudinal edge of the main body 25, in a second direction which is generally opposite to the first direction. A pair of openings 30 is defined in opposite end portions of the main body 25 respectively. Another pair of openings 30 is defined in opposite end portions of the operation portion 28 respectively.

Referring particularly to FIGS. 3–6, in assembly of the fastening device, the vertical portions 18 of the hooks 16 are received into the openings 30 of the main body 25. The vertical portions 18 are then received into the openings 30 of the operation portion 28 until the main body 25 of the locating plate 12 is located between the vertical portions 18 and the protrusions 20 of the hooks 16 (see FIG. 5). Thus, the locating plate 12 is clasped to the first side panel 14 of the bracket 10.

Referring to FIGS. 1–6, in using the fastening device to secure the data storage device 40, the data storage device 40 is pushed into the bracket 10. The screw 50 slides in the groove 24 of the bracket 10. The data storage device 40 is pushed until the apertures 42 of the data storage device 10 are aligned with the through holes 22 of the bracket 10. The operation portion 28 is depressed, to cause the main body 25 to move toward the first side panel 14 of the bracket 10. Referring particularly to FIG. 6, the protrusions 20 are thus extended through the openings 30 of the main body 25. The pins 26 of the main body 25 are simultaneously inserted into the through holes 22 of the bracket 10 and the apertures 42 of the data storage device 40. The protrusions 20 cooperate with the first side panel 14 to hold the locating plate 12 therebetween. Thus, the data storage device 40 is firmly secured to the bracket 10 by the fastening device.

To detach the data storage device 40 from the bracket 10, the operation portion 28 of the locating plate 12 is pulled up, causing the protrusions 20 to exit the main body 25 of the locating plate 12. The pins 26 of the locating plate 12 are simultaneously moved out of the apertures 42 of data storage device 40 and the through holes 22 of the bracket 10. The data storage device 40 is thus released from the fastening device, and can then be easily removed from the bracket 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastening device for securing a data storage device, the fastening device comprising:
    a bracket adapted for receiving the data storage device therein, the bracket having a side panel, a pair of hooks being outwardly stamped from the side panel, a pair of through holes being defined in the side panel below the hooks; and
    a locating plate clasped to the side panel of the bracket on the hooks, the locating plate comprising a main body, a pair of pins extending perpendicularly from an edge of the main body in a first direction for extending through the through holes of the bracket and engaging with the data storage device, a pair of openings being defined in the main body for receiving the hooks of the bracket.

2. The fastening device as claimed in claim 1, wherein the hooks of the bracket each comprise a horizontal portion and a vertical portion extending upwardly from the horizontal portion.

3. The fastening device as claimed in claim 2, wherein a protrusion is formed on each of the hooks, and the protrusion of each of the hooks is downwardly stamped from the horizontal portion.

4. The fastening device as claimed in claim 2, wherein the main body of the locating plate is located between the vertical portions and the protrusions of the hooks.

5. The fastening device as claimed in claim 3, wherein the protrusions cooperate with the side panel to hold the main body of the locating plate therebetween.

6. The fastening device as claimed in claim 2, wherein an operation portion extends from an opposite edge of the main body in a second direction which is generally opposite to the first direction.

7. The fastening device as claimed in claim 6, wherein a pair of openings is defined in the operation portion.

8. The fastening device as claimed in claim 7, wherein the vertical portion of each of the hooks is inserted into a corresponding opening of the main body and then into a corresponding opening of the operation portion.

9. A data storage device assembly comprising:
    a data storage device defining a plurality of apertures in one side thereof, and further comprising a protruding member protruding from an opposite side thereof;
    a bracket having first and second side panels, the first side panel forming a plurality of hooks stamped outwardly therefrom and defining a plurality of through holes therein, the second side panel defining a groove therein for slidingly receiving the protruding member of the data storage device; and
    a locating plate defining a plurality of openings therein for receiving the hooks of the bracket and thereby being clasped to the bracket, the locating plate further comprising a main body, and a plurality of pins extending from an edge of the main body for extending through the through holes of the bracket and the apertures of the data storage device and thereby securing the data storage device in the bracket.

10. The data storage device assembly as claimed in claim 9, wherein a plurality of support tabs is formed in the bracket to support the data storage device.

11. The data storage device assembly as claimed in claim 9, wherein the hooks each have a generally L-shaped profile.

12. The data storage device assembly as claimed in claim 9, wherein the pins extend generally perpendicularly from the main body of the locating plate toward the first side panel of the bracket.

13. The data storage device assembly as claimed in claim 9, wherein the main body of the locating plate is located substantially between the hooks of the bracket and the through holes of the bracket.

14. The data storage device assembly as claimed in claim 13, wherein the through holes of the bracket are disposed below the hooks of the bracket.

15. The data storage device assembly as claimed in claim 9, wherein an operation portion extends from an opposite edge of the main body, in a direction away from the first side panel of the bracket.

16. A data storage device assembly comprising:
    a data storage device defining at least one aperture in one side thereof, and further comprising a protruding member protruding from an opposite side thereof;
    a bracket for receiving the data storage device therein, the bracket comprising first and second side panels that are parallel to each other, the second side panel defining a groove therein for slidingly receiving the protruding member of the data storage device; and
    a fastening device for securing the data storage device in the bracket, the fastening device comprising:
        a clasping section stamped from the first side panel of the bracket, at least one protrusion being formed on the clasping section, wherein at least one through hole is defined in the first side panel below the clasping section; and
        at least one locating plate being attachable to the clasping section, at least one pin extending from a main body of the locating plate, the at least one pin further extending through the at least one through hole of the first side panel and the at least one aperture of the data storage device, wherein the at least one protrusion of the clasping section cooperates with the first side panel to hold the main body of the locating plate therebetween.

17. The data storage device assembly as claimed in claim 16, wherein the clasping section comprises a horizontal portion engaging with the main body of the at least one locating plate, and a vertical portion extending upwardly from the horizontal portion.

18. The data storage device assembly as claimed in claim 17, wherein the at least one protrusion is formed on the horizontal portion of the clasping section.

19. The data storage device assembly as claimed in claim 17, wherein the locating plate comprises an operating portion extending from the main body for enagaging with the vertical portion of the clasping section and facilitating operation of the locating plate.

* * * * *